United States Patent [19]

Narita et al.

[11] Patent Number: 5,278,752
[45] Date of Patent: Jan. 11, 1994

[54] PROCEEDS PROCESSING APPARATUS REQUESTING A CUSTOMER TO CONFIRM PROCEEDS PROCESSING

[75] Inventors: Kiyokazu Narita; Hiroharu Hirata, both of Tokyo, Japan

[73] Assignee: Oki Electric Industry Co., Ltd., Tokyo, Japan

[21] Appl. No.: 517,806

[22] Filed: May 2, 1990

[30] Foreign Application Priority Data

May 9, 1989 [JP] Japan .................... 1-114290

[51] Int. Cl.$^5$ .................................. G07G 1/12
[52] U.S. Cl. ......................... 364/404; 364/405; 235/380
[58] Field of Search ............. 364/405, 404; 235/379, 235/380

[56] References Cited

U.S. PATENT DOCUMENTS

| | | |
|---|---|---|
| 4,608,486 | 8/1986 | Bernstein et al. |
| 4,683,536 | 8/1987 | Yamamoto ............... 364/405 |
| 4,775,782 | 10/1988 | Mergenthaler et al. |
| 4,843,547 | 6/1989 | Fuyama et al. |

FOREIGN PATENT DOCUMENTS

| | | |
|---|---|---|
| 0266798 | 5/1988 | European Pat. Off. |
| 0376619 | 7/1990 | European Pat. Off. |
| 47806 | 7/1978 | Japan ............... 364/405 |
| 157995 | 7/1986 | Japan. |

Primary Examiner—Roy N. Envall, Jr.
Assistant Examiner—Ari M. Bai
Attorney, Agent, or Firm—Spencer, Frank & Schneider

[57] ABSTRACT

A proceeds processing apparatus has an apparatus body, and a keyboard and a card reader provided on the apparatus body for entering first data indicative of the contents of a transaction. An operation control is accommodated in the apparatus body for executing data processing including proceeds processing by performing arithmetic operations with inputted data. A display and a printer are provided on the apparatus body and interconnected to the operation control for outputting the result of data processing. A customer-oriented input unit has a keyboard and a control for inputting second data for determining whether or not the first data entered are agreed to. An interface and a cable electrically interconnect the keyboard and the control to the operation control. The operation control deterinines, in response to the second data fed from the keyboard and the control, whether or not the first data are agreed to on the basis of the second data and feeds a result of decision to the display and printer.

8 Claims, 6 Drawing Sheets

PROCEEDS PROCESSING APPARATUS REQUESTING A CUSTOMER TO CONFIRM PROCEEDS PROCESSING

BACKGROUND OF THE INVENTION

1. Field of the Invention

The present invention relates to a cash register or similar proceeds processing apparatus.

2. Description of the Prior Art

A proceeds processing apparatus such as a cash register is usually installed in a store or similar facility and operated by an attendant or a clerk to enter data of article codes, amounts of money, etc. In response, the apparatus executes proceeds processing including summation of the amounts of money, receipt of money, issuance of a detailed account, and totalization. Proceeds processing apparatus applicable to a POS system is interconnected to a host data processing apparatus by a communications line to interchange transaction data with the latter. With this kind of proceeds processing apparatus, it is possible to debit a customer's account when a credit card is used or to settle accounts even when a debit card is used.

A prior art proceeds processing apparatus has a body which is composed of a keyboard and/or a scanner for entering data of article codes, amounts of money and so forth, a display for displaying article codes, amounts of money and so forth as well as operation guidances, a printer for printing out transaction data on a recording medium to issue a detailed account or receipt, and a card reader having a slot adapted for receiving a card to read data out of the card. An operation control unit controls such components of the apparatus to sum the amounts of money and settle the accounts. A communication control unit is interconnected to the operation control unit while a communication line is interconnected to the communication control unit, whereby the communication of the apparatus with a host computer is controlled.

A proceeds processing operation available with the above construction is as follows. When an attendant or a clerk starts up the apparatus by, for example, turning on the power switch of the apparatus, a guidance meant for the attendant appears on the display. Guided by the guidance, the attendant enters data indicative of amounts of money and other similar data on the keyboard or via the card reader. In response, the apparatus totalizes the inputted data and communicates with the host computer to execute proceeds processing. The contents of the proceeds processing are printed out on a recording medium by the printer to produce a detailed account in the form of a receipt or statement strip, for example.

A problem with the prior art proceeds processing apparatus is that usually a customer at a store, for example, cannot see the contents of a transaction processed by the apparatus until a statement issued after a sequence of proceeds processing has been handed to the customer. More specifically, a customer is not allowed to compare the contents of a transaction processed by the apparatus with those of the actual transaction until he receives a statement on which those contents are printed. Assume that the result of processing executed by the apparatus differs from the contents of the actual transaction due to the attendant's erroneous operations of the keys. Then, the customer in many cases cannot find the error until the customer receives a detailed account indicated on a statement. In such a case, the attendant has to cancel the entire proceeds processing executed by the apparatus and start inputting all the necessary data again.

A current trend in business transactions including shopping is toward the use of credit cards and cash cards in place of cash. The prior art proceeds processing apparatus allows proceeds processing in connection with such cards to be finished even without confirming the contents of a transaction of which the data was entered by an attendant. Actually, it often occurs that a customer does not notice incorrect processing executed by the apparatus until the store debits the customer's account later, for example.

As stated above, the prior art proceeds processing apparatus is not satisfactory in various aspects such as efficient processing, customer service, and mutual reliance between customers and facilities.

A proceeds processing apparatus which guarantees the issuance of a detailed account of a transaction is disclosed in Japanese Patent Laid-Open Publication No. 157995/1986. The apparatus disclosed in this Laid-Open Publication is constructed such that until a detailed account of a transaction has been issued and an exclusive operation for confirming the receipt thereof has been performed, processing associated with the next transaction cannot be done. This is successful in, for example, preventing a person from unjustly including data of a certain transaction in the processing of the subsequent transaction.

SUMMARY OF THE INVENTION

It is therefore an object of the present invention to provide a proceeds processing apparatus which allows a customer to confirm the contents of proceeds processing entered by the attendant at the time of transaction, while enhancing proceeds processing efficiency.

The proceeds processing apparatus of the present invention comprises a first casing, a first input device provided on the first casing for entering first data indicative of the contents of a transaction, an operation control accommodated in the first casing for executing data processing including proceeds processing by performing arithmetic operations with inputted data, an output device provided on the first casing and interconnected to the operation control for outputting the result of data processing, a second input device provided on the second casing for inputting second data representing whether or not the first data entered on the first input device is agreed to, and an interconnecting device for electrically interconnecting the second input device to the operation control. The operation control determines, in response to the second data fed from the second input device, whether or not the first data entered on the first input device is agreed to on the basis of the second data and feeds the result of the decision made by the operation control to the output device.

In the above construction, when transaction data is entered on the first input device, the operation control executes processing necessary for proceeds processing on the basis of the transaction data. In this instant, when the second input device is operated to enter an input for checking the contents of the transmission data, the operation control determines whether or not the transmission data is agreed to on the basis of the input on the second input device. This allows a customer to check at the time the contents of a transaction are entered on the apparatus by an attendant, thereby enhancing the chance that the customer will become aware of any errors.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
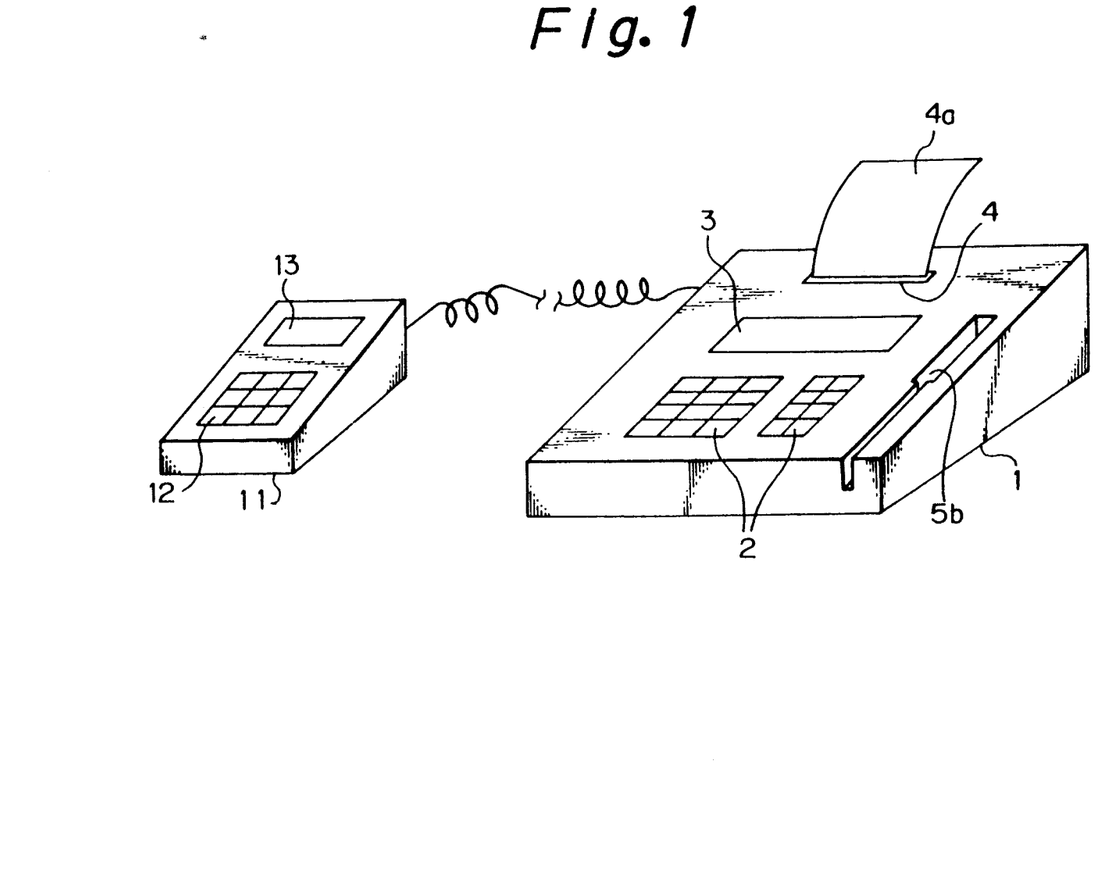
FIG. 1 is a perspective view of a proceeds processing apparatus embodying the present invention.
Figure 2:
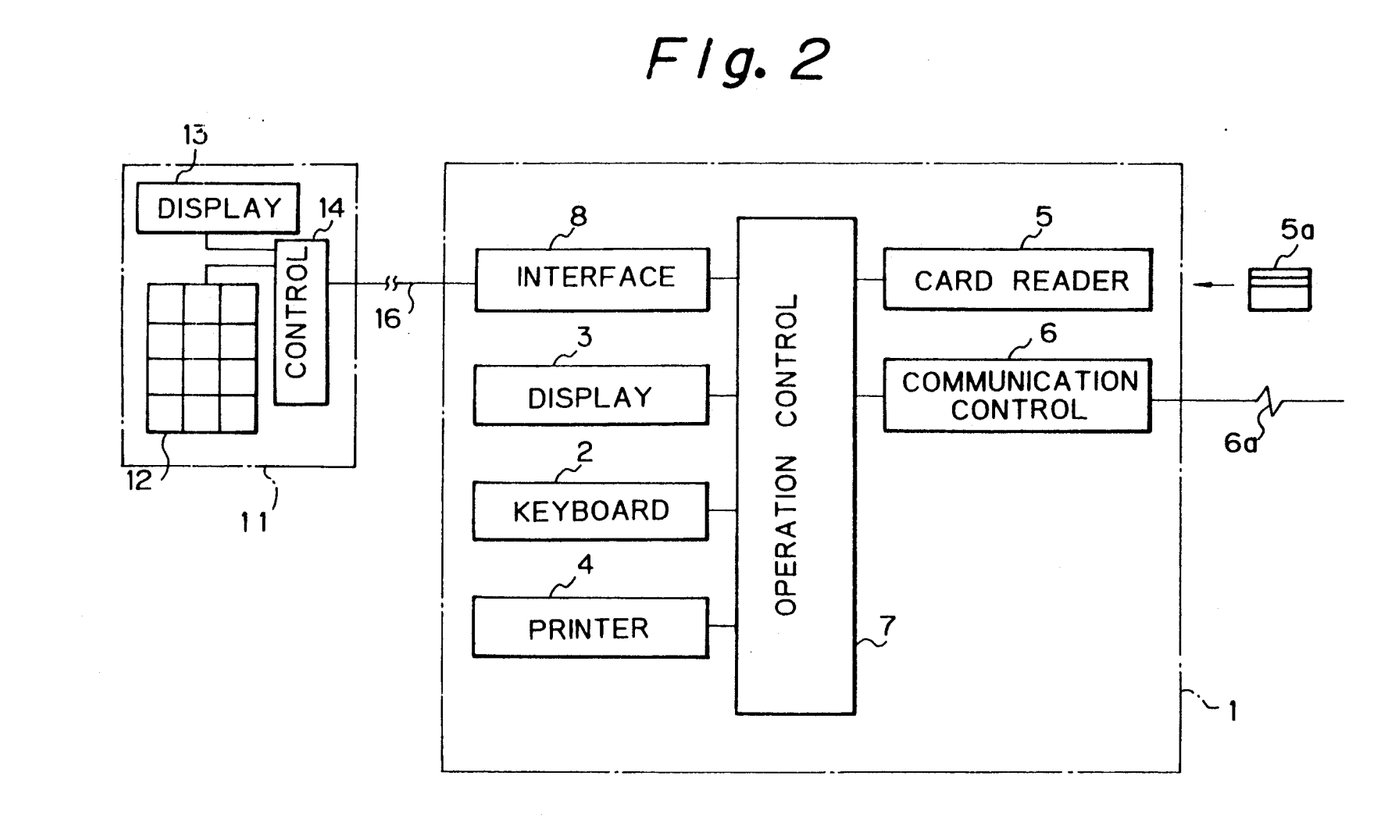
FIG. 2 is a block diagram schematically showing the functional construction of the embodiment shown in FIG. 1.

Referring to FIGS. 1 and 2 of the drawings, a proceeds processing apparatus embodying the present invention is generally made up of an attendant-oriented apparatus body 1 and a customer-oriented input unit 11. The apparatus of the illustrative embodiment may be installed in a store or similar facility. The apparatus body 1 is operated by an attendant such as a clerk of a store to enter data representative of article codes and amounts of money and so forth, and executes various kinds of proceeds processing which include summing the amounts of money, receiving money, issuing a detailed account, and totalization. This apparatus body 1 includes a keyboard 2 accessible for entering data of article codes, amounts of money, numbers of articles, and other data associated with a transaction. The keyboard 2 is interconnected to an operation control 7 which sums the amounts of money and settles accounts, performs arithmetic operations such as totalization, and supervises the entire apparatus. The apparatus body 1 further includes a display 3 and a printer 4 which are also interconnected to the operation control 7. The display 3 displays the amounts of money and other transaction data as well as messages for guiding the operator, under the control of the operation control 7. The printer 4 prints out transaction data on a recording medium to thereby produce a detailed account or receipt strip 4a.

The proceeds processing apparatus is interconnected to a host computer or similar host data processing system, not shown, by a communications line 6a in order to interchange transaction data with the data processing system. The apparatus is, therefore, capable of settling accounts with a card 5a which may be a credit card or a debit card, for example. For this purpose, the apparatus body 1 has a card reader 5 which is provided with a slot 5b receiving the card 5a. The card reader 5 reads data out of the card 5a when the latter is inserted in the slot 5b. The card 5a is implemented as a card-like medium capable of storing data therein, e.g. a magnetic card, IC card, or optical card. The card reader 5 is also interconnected to the operation control 7. Further interconnected to the operation control 7 is a communication control unit 6. The communications line 6a appears in the communication control unit 6 so as to control the communication of the apparatus with the host. The components 2, 3, 4, 5 and 6 described above are housed in a single casing 1.

The customer-oriented input unit 11 basically is located at the same place as the apparatus body 1 and in principle is operated by a customer for confirming transaction data. The input unit 11 has a display 13 for allowing a customer to understand data included in a transaction as well as a customer's PIN (Personal Identification Number) entered, and a keyboard or keypad 12 which a customer may operate to enter instructions for confirmation or data as well as his or her PIN.

In the illustrative embodiment, an interface 8 is incorporated in the apparatus body 1. The customer-oriented input unit 11 is interconnected to the operation control 7 via the interface 8 by a cable 16. The operation control 7 has a function of determining whether or not the processing associated with a certain transaction is approvable, in response to data entered on the input unit 11. If desired, the cable 16 may be replaced with a wireless link which uses a radio wave.

As a clerk or similar attendant starts up the proceeds processing apparatus by performing a predetermined operation such as the turn-on of a power switch of the apparatus, a guidance or message appears on the display 3 of the apparatus body. Then, guided by the message, the attendant enters data indicative of the amounts of money and other necessary data associated with a transaction on the keyboard 2 or via the card reader 5.

The customer-oriented input unit 11 comprises a control 14 in addition to the keyboard 12 and display 13. When a customer enters data of an amount of money relating to a transaction on the keyboard 12, the amount data appears on the display 13 and is sent to the operation contol 7 of the apparatus body 1 via the interface 8.

Figure 3:
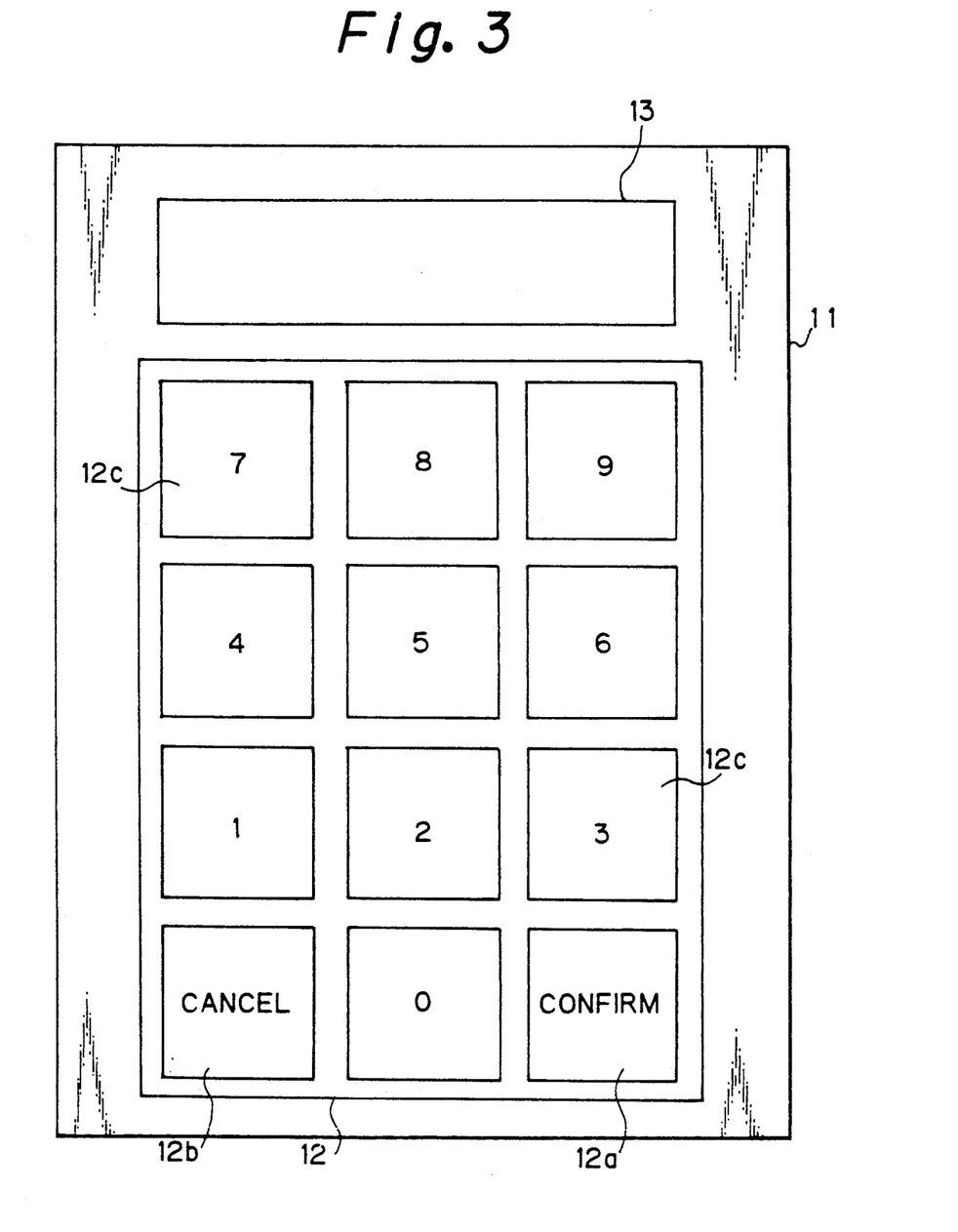
FIG. 3 is a front view of a customer-oriented input unit of the illustrative embodiment.

FIG. 3 is an enlarged view of a panel or operation board which is provided on the top of the customer-oriented input unit 11. As shown, in the illustrative embodiment, the keyboard 12 has numeral keys 12c, a cancel key 12b, and a confirm key 12a. A customer enters digital representing an amount of money on the numeral keys 12c and then presses the confirm key 12a to indicate the end of the inputting operation. In the event when the customer has entered an incorrect numerical value inadvertently, the customer may press the cancel key 12b to cancel it and then reenter a correct numerical value.

The operation control 7 performs totalization and other arithmetic operations necessary for proceeds processing in response to proceeds data which the attendant enters on the keyboard 2 of the apparatus body 1. When the processing reaches a pre-programmed stage the operation control 7 urges the customer to enter an instruction on the customer-oriented input unit 11. On the entry of the instruction on the input unit 11, the operation control 7 determines whether or not it should continue with the proceeds processing, on the basis of the entered instruction. If the result of the decision is positive, the operation control 7 executes totalization and, if necessary, communicates with the host over the communication control unit 6 and communication line 6a to execute proceeds processing. The contents of the proceeds processing are printed out on a detailed account or statement strip 4a by the printer 4.

Figure 4A:
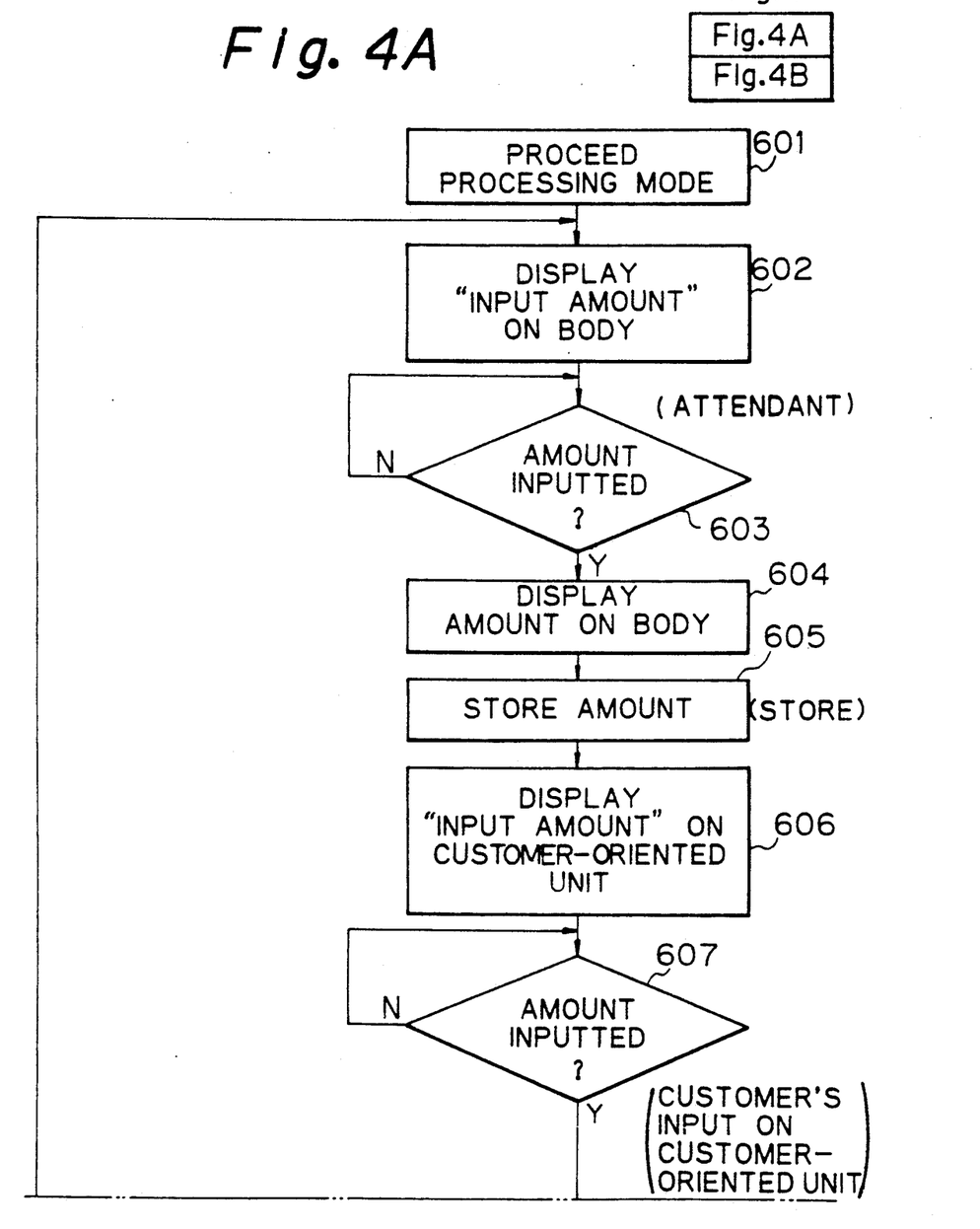
FIGS. 4A and 4B, when combined as shown in FIG. 4, are a flowchart demonstrating a specific operation flow of an operation control included in the embodiment.
Figure 4B:
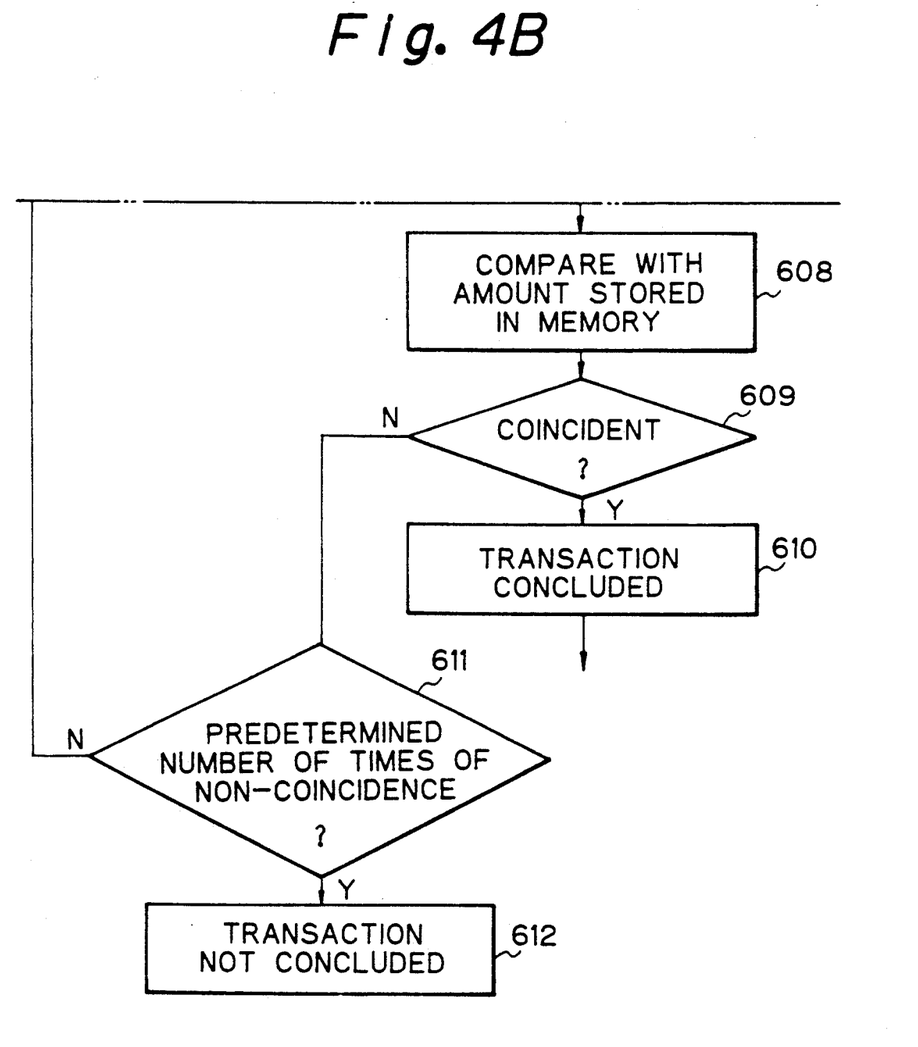

The operation of the proceeds processing apparatus having the above construction will be described with reference to FIGS. 4A and 4B. First, a proceeds processing mode is set up by the turn-on of the power switch of the apparatus body 1 or the manipulation of an exclusive key for the mode, not shown (step 601). In response, the operation control 7 displays on the display 3 a guidance for urging the operator or attendant to enter data of an amount of money, e.g. a message "INPUT AMOUNT" (step 602). The attendant enters data of an amount of money in reply to the guidance message (step 603). The amount appears on the display 3 (step 604). The entered data of an amount of money is stored to a memory, not shown, built in the operation control 7 (step 605). Subsequently, a guidance in the form of a message "INPUT AMOUNT", for example, also appears on the display 13 of the customer-oriented input unit 11 (step 606). The customer enters data of an amount of money he or she believes on the keyboard 12 of the input unit 11 (step 607). The operation control 7 compares it with the data of the amount of money stored in the memory (step 608) to see if the two amounts compare equally (step 609). If the result of the decision at the step S609 is positive (Y), the operation control 7 decides that the transaction has been concluded (step 610). Then, the apparatus executes further processing. However, when the result of the decision at the step S609 is negative (N), the operation control 7 proceeds to determine whether or not non-coincidence has occurred a predetermined number of times (step 611). If the result of this decision at the step 611 is positive (Y), the operation control 7 decides that the transaction has not been concluded and inhibits the apparatus from executing further processing. If the number of times that non-coincidence has occurred is smaller than the predetermined value as decided in the step 611 (N), the program returns to the step 602.

The illustrative embodiment allows the customer to confirm the contents of a transaction on the input unit 11 at the place where he or she stands. This enhances the chance that the customer immediately finds out incorrect transaction data which may be inputted inadvertently by the attendant on the apparatus body 1. Eventually, efficient proceeds processing is enhanced to offer better customer service. In addition, troubles often experienced in debiting the customer's account are eliminated, so that mutual reliance between customers and facilities is improved.

Figure 5:
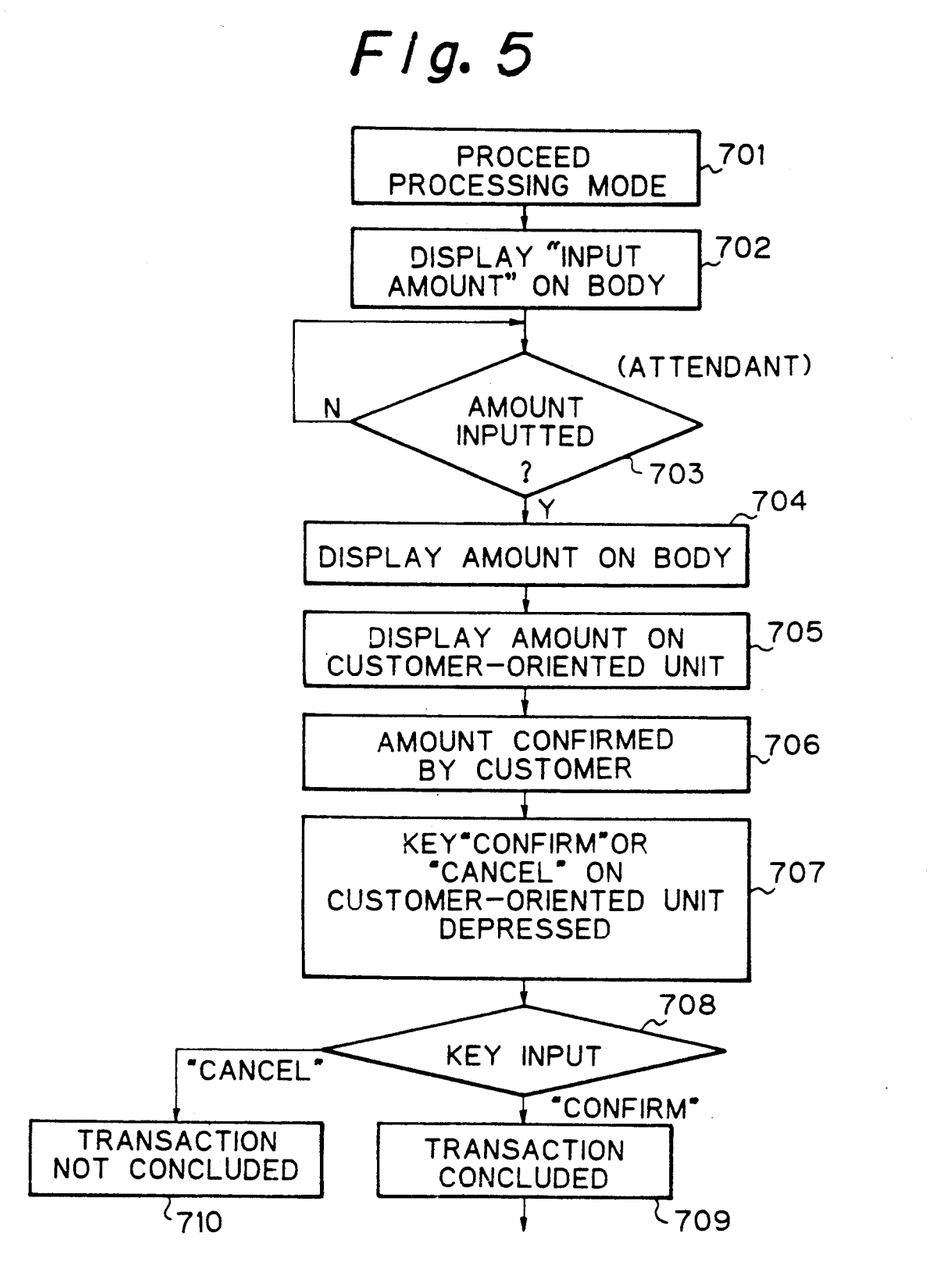
FIG. 5 is a flowchart similar to FIG. 4, showing an alternative control flow which is also practicable with the illustrative embodiment.

The control sequence of the operation control 7 may be programmed such that the display 13 of the customer-oriented input unit 11 displays an amount of money entered by the attendant and thereby urges the customer to operate the input unit 11 for confirmation, instead of forcing the customer to enter data of an amount of money on the numeral keys 12. Such an alternative control flow is shown in FIG. 5. With the control flow of FIG. 5, the customer needs only to operate either one of the confirm key 12a and the cancel key 12b which are provided on the keyboard 12 of the input unit 11. More specifically, the customer reads an amount of money indicated on the display 3 of the apparatus body 1 or on the display 13 of the customer-oriented unit 11 and, if it is correct, presses the confirm key 12a. If the amount appearing on the display 3 or 13 is not correct, the customer presses the cancel key 12b. In this manner, the customer may either agree to or reject the contents of a transaction entered by the attendant.

FIG. 5 is a flowchart showing the above-mentioned modified control sequence. The procedure begins with a step 701 in which a process processing mode is set up by the turn-on of the power source of the apparatus body 1 or the operation of the exclusive key for that mode, not shown. Then, the display 3 of the apparatus body 1 displays a guidance for urging the attendant or clerk to enter data of an amount of money, e.g. "INPUT AMOUNT" (step 702). The attendant enters data of an amount of money (step 703), which in turn appears on the display 3 of the apparatus body 1 and on the display 13 of the customer-oriented input unit 11 (step 705).

In the above condition, the customer looks at either one of the displays 3 and 13 to read the amount of money (step 706) and then presses either one of the confirm key 12a and cancel key 12b provided on the keyboard 12 of the input unit 11 (step 707). In response, the operation control 7 determines which of the confirm key 12a and the cancel key 12b has been pressed (step 708) and, if the confirm key 12a is sensed to be pressed, decides that the transaction has been concluded (step 709). Then, the apparatus executes further processing. When the operation control 7 determines that the cancel key 12b has been pressed, it decides that the transaction has not been concluded (step 710) and inhibits the apparatus from executing any further processing.

The procedure described above with reference to FIG. 5 is comparable with the procedure of FIG. 4 as to the advantages over the prior art. It is to be noted that although the operation flow of FIGS. 5A and 5B is simpler than that of FIG. 4 so far as the customer's manipulations are concerned, the former compares somewhat unfavorably with the latter as to accurate checking because it does not allow the customer to enter data of an amount of money.

In summary, it will be seen that the present invention provides a proceeds processing apparatus with which a customer can confirm on the spot the contents of a transaction entered by an attendant, by using customer-oriented inputting means. The apparatus, therefore, relatively easily improves the proceeds processing efficiency, customer service, and mutual reliance between customers and facilities.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. Specifically, the present invention covers all the apparatuses of the kind having customer-oriented inputting means which may be operated by a customer for checking the contents of a transaction, and having a function of determining whether or not the contents of the transaction are acceptable on the basis of data fed from the customer-oriented inputting means. For example, the data to be entered on the customer-oriented inputting means may be the customer's PIN. In such a case, an arrangement may be made such that the customer confirms the content of a transaction by operating a confirm key, inserts a cash card or a credit card into the apparatus to enter its contents, and then enters the PIN for final consent on the customer-oriented inputting means.

What is claimed is:

1. A proceeds processing apparatus for enabling a customer and an attendant to confirm the contents of a transaction value comprising:

an attendant-oriented apparatus body;

first input means provided with a first operating member on said attendant-oriented apparatus body, said first operating member permitting an attendant to enter first data indicative of the transaction value;

operation control means accommodated in said attendant-oriented apparatus body for executing data processing including proceeds processing by performing arithmetic operations with data inputted by the attendant;

a customer-oriented input unit;

interconnecting means for electrically interconnecting said customer-oriented input unit to said operation control means; and second input means provided on said customer-oriented input unit, said second input means including a second operating member permitting a customer to input second data representative of at least a part of the contents of the transaction value, said operation control means determining, in response to the second data fed from said second input means, whether or not the first data are agreed to by comparing the second data with the first data.

2. An apparatus in accordance with claim 1, further comprising first display means provided on said attendant-oriented apparatus body for displaying a message urging entry of the second data on said first operating member.

3. An apparatus in accordance with claim 1, further comprising communication control means for controlling interchange of data between said operation control means and a communication line to be connected to a host data processing apparatus, said communication control means being accomodated in said attendant-oriented apparatus body and interconnected between said operation control means and the communication line, said operation control means being operative to communicate with the data processing apparatus via said communication control means to execute data processing.

4. An apparatus in accordance with claim 1, wherein said first input means further comprises card reader means provided on said attendant-oriented apparatus body and interconnected to said operation control means for reading data out of a card-like storing medium and feeding said read data to said operation control means as at least a part of the first data.

5. An apparatus in accordance with claim 1, wherein said output means further comprises printer means for printing out the result of data processing on a recording medium.

6. An apparatus in accordance with claim 1, wherein said output means further comprises display means for displaying a guidance guiding operation of said first input means, the first data, and the result of the data processing.

7. An apparatus in accordance with claim 1, wherein said interconnecting means further comprises:

interface means interconnected to said operation control means for interfacing said operation control means and said second input means to each other; and a cable for electrically interconnecting said interface means and said second input means.

8. A proceeds processing apparatus for enabling a customer and an attendant to confirm the contents of a transaction comprising:

an attendant-oriented apparatus body;

first input means provided on said attendant-oriented apparatus body, said first input means permitting an attendant to enter first data indicative of the contents of the transaction;

operation control means accommodated in said attendant-oriented apparatus body for executing data processing including proceeds processing by performing arithmetic operations with data inputted by the attendant;

output means provided on said attendant-oriented apparatus body, said output means being interconnected with said operation control means;

a customer-oriented input unit electrically interconnected to said operation control means;

display means provided on said customer-oriented input unit for displaying the first data entered on said first input means and fed from said first input means; and second input means provided on said customer-oriented input unit comprising an operating member for inputting second data representative of whether or not the first data is agreed to, said operation control means determining, in response to the second data fed from said second input means, whether or not the first data has been agreed to on the basis of said second data.

* * * * *